United States Patent [19]

Carter et al.

[11] Patent Number: 5,232,977
[45] Date of Patent: Aug. 3, 1993

[54] RUBBER COMPOSITION

[75] Inventors: John D. Carter, Uniontown; Richard R. Smith, Cuyahoga Falls, both of Ohio

[73] Assignee: The Goodyear Tire & Rubber Company, Akron, Ohio

[21] Appl. No.: 652,160

[22] Filed: Feb. 7, 1991

Related U.S. Application Data

[63] Continuation-in-part of Ser. No. 248,849, Sep. 26, 1988, abandoned.

[51] Int. Cl.$^5$ .................... C08L 67/02; C08F 8/00
[52] U.S. Cl. .................... 524/513; 525/152; 525/177
[58] Field of Search .................... 525/152, 177

[56] References Cited

U.S. PATENT DOCUMENTS

| | | | |
|---|---|---|---|
| 4,728,698 | 3/1988 | Isayev et al. | 525/439 |
| 4,772,421 | 9/1988 | Ikenaga et al. | 525/356 |
| 4,777,204 | 10/1988 | Ikenaga et al. | 524/439 |
| 4,798,849 | 1/1989 | Thomas et al. | 524/251 |

FOREIGN PATENT DOCUMENTS

| | | |
|---|---|---|
| 0227299 | 1/1987 | European Pat. Off. |
| 63-46242 | 2/1988 | Japan |
| 8701822 | 3/1987 | PCT Int'l Appl. |

OTHER PUBLICATIONS

Lorenzo et al. Polymer Preprints, 29(1), 1988, pp. 488–490.

Primary Examiner—Melvyn I. Marquis
Assistant Examiner—Helen F. Lee
Attorney, Agent, or Firm—Alvin T. Rockhill

[57] ABSTRACT

It is often desirable to increase the modulus of rubbers which are utilized in manufacturing a wide variety of articles. For instance, carbon black is frequently added to rubbers to increase the modulus thereof. However, the incorporation of fillers, such as carbon black, into rubbers typically results in the rubber being more difficult to process. This invention discloses the incorporation of certain thermotropic liquid crystalline polymers into rubbers in order to improve the processability of the rubber and also to increase the modulus thereof. This invention specifically discloses a rubber composition having a high modulus and excellent processability which is comprised of a blend of (1) at least one elastomer, and (2) from about 2 phr to about 40 phr of at least one thermotropic liquid crystalline polymer containing an aliphatic spacer which has a crystalline to nematic transition at a temperature which is within the range of about 110° C. to about 180° C.

18 Claims, No Drawings

RUBBER COMPOSITION

This is a continuation-in-part of U.S. patent application Ser. No. 07/248,849, filed on Sep. 26, 1988 (now abandoned).

BACKGROUND OF THE INVENTION

Rubbers are typically compounded with numerous chemical agents prior to being molded and cured into desired articles of manufacture. The rubber compounding procedure utilized is normally carried out in a mixing device which relies on shearing forces, such as a Banbury mixer or a mill mixer. During this compounding procedure, the rubber is commonly mixed with sulfur, accelerators, carbon black, antidegradants, and other desired rubber chemicals. It is also very common to blend more than one type of rubber in the compounding procedure.

The high shearing forces required to attain homogeneous mixtures result in a degradation of the rubber. For this reason, the Mooney viscosity of the rubber being compounded decreases during the mixing procedure. This problem becomes more serious in rubber compounds which contain reinforcing materials, such as carbon black, which are included to increase the modulus of the rubber. For instance, rubber compounds which contain large amounts of carbon black are particularly difficult to process. Nevertheless, it is often necessary to include significant amounts of carbon black in rubber compounds to attain the desired modulus.

Processing oils naturally improve the processability of rubbers. However, the inclusion of processing oils in such rubbers results in a decrease in modulus. Accordingly, the inclusion of substantial amounts of processing oils in rubber compounds is frequently not a viable option for attaining good processability. High rubber performance requirements have traditionally necessitated compounding rubbers which have very poor processability characteristics.

SUMMARY OF THE INVENTION

The subject invention is based upon the unexpected discovery that certain thermotropic liquid crystalline polymers can be utilized to greatly improve the processability of rubbers. The thermotropic liquid crystalline polymers which are useful in the practice of this invention are in the nematic phase at a temperature which is within the range of about 110° C. to about 180° C. The liquid crystalline polymers which are most useful in the practice of this invention are in the nematic phase at the temperature utilized in processing the rubber. Normally, the thermotropic liquid crystalline polymer will have a crystalline to nematic transition at a temperature which is within the range of about 110° C. to about 220° C. However, highly amorphous liquid crystalline polymers can also be utilized if they are capable of being in the mesophase at a temperature which is within the range of about 40° C. to about 180° C. It has also been unexpectedly found that such thermotropic liquid crystalline polymers also increase the modulus of rubbers. It is, therefore, possible to incorporate such liquid crystalline polymers to improve the processability and to increase the modulus thereof. In the past this has been a very elusive combination of results to attain. This is because the utilization of conventional agents for increasing modulus, such as carbon black, has resulted in the mixing of the rubber being more difficult. On the other hand, the inclusion of agents which improve processability has typically resulted in a decrease in modulus. In other words, conventional techniques to improve modulus have resulted in sacrificing processability. This invention overcomes this problem.

The technique of this invention is applicable to virtually any type of rubbery elastomer. It is carried out by simply incorporating a small amount of the thermotropic liquid crystalline polymer into the elastomer. Generally from about 2 phr (parts per hundred part of rubber) to about 40 phr of the thermotropic liquid crystalline polymer will be incorporated into the elastomer to form a blend. The blend accordingly has improved processability and a higher modulus.

The present invention more specifically discloses a rubber composition having a high modulus and excellent processability which is comprised of a blend of (1) at least one elastomer, and (2) at least one thermotropic liquid crystalline polymer containing an aliphatic spacer, wherein the thermotropic liquid crystalline polymer is substantially in the mesophase with the polymer morphology of the liquid crystalline polymer being predominately amorphous at temperature which is within the range of about 40° C. to about 180° C.

The subject invention also reveals a rubber composition having a high modulus and excellent processability which is comprised of a blend of (1) at least one elastomer, and (2) from about 2 phr to about 40 phr of at least one thermotropic liquid crystalline polymer containing an aliphatic spacer which has a crystalline to nematic transition at a temperature which is within the range of about 110° C. to about 220° C.

DETAILED DESCRIPTION OF THE INVENTION

The technique of this invention can be utilized to improve the processability and to increase the modulus of virtually any type of rubber elastomer. The elastomers utilized in accordance with this invention typically contain conjugated diene monomers and/or nonconjugated diene monomers. Such conjugated and nonconjugated diene monomers typically contain from 4 to about 12 carbon atoms and preferably contain from 4 to about 8 carbon atoms. Some representative examples of suitable conjugated diene monomers include 1,3-butadiene, isoprene, 2,3-dimethyl-1,3-butadiene, 2-methyl-1,3-pentadiene, 3,4-dimethyl-1,3-hexadiene, 4,5-diethyl-1,3-octadiene, phenyl-1,3-butadiene and the like. The rubber elastomer can also contain various vinyl aromatic monomers, such as styrene, 1-vinyl naphthalene, 2-vinyl naphthalene, α-methyl, styrene, 4-phenyl styrene, 3-methyl styrene, and the like. In fact, best results are believed to be attained when the rubber contains at least one type of vinyl aromatic monomer. This is believed to be due to better compatibility between the rubber and the thermotropic liquid crystalline polymer. Some representative examples of elastomers which can be utilized in the rubber compositions of this invention include polybutadiene, styrene-butadiene rubber (SBR), synthetic polyisoprene, natural rubber, isoprene-butadiene rubber, isoprene-butadiene-styrene rubber, nitrile rubber, carboxylated nitrile rubber and EPDM rubber. Rubber compositions which contain SBR have a particularly desirable combination of properties.

The rubber compositions of this invention are prepared by simply mixing the thermotropic liquid crystalline polymer into the rubber elastomer. This can be done utilizing a wide variety of mixing techniques. In most cases, the mixing will be carried out utilizing a Banbury mixer or a mill mixer. It will generally be preferred to mix the thermotropic liquid crystalline polymer into the elastomer during the nonproductive compounding stage. By doing so, the benefit of improved processability is realized in both the preparation of the nonproductive compound and the productive compound. However, in the alternative, the liquid crystalline polymer can be mixed throughout the elastomer in a separate mixing stage. In such cases, it is advantageous to mix the thermotropic liquid crystalline polymer into the elastomer before it is compounded with other materials to reap the benefits of improved processability during the preparation of the nonproductive and productive compounds. It should be noted that the nonproductive compounds do not contain a curative, such as sulfur, zinc oxide or accelerators. On the other hand, productive compounds contain a curative which will cure (vulcanize) the rubber after it is heated to a curing temperature.

It is generally desirable for the thermotropic liquid crystalline polymer to be in powder form prior to mixing with the elastomer. This is because a better blend of the thermotropic liquid crystalline polymer throughout the elastomer is readily attained when the thermotropic liquid crystalline polymer is in powder form. However, the liquid crystalline polymer can also be in the form of pellets, chips, flakes, or some other form prior to blending with the elastomer. Nevertheless, it is generally preferred for the chunks, pellets, chips, or flakes of the liquid crystalline polymer to be a rather small size to facilitate better and more rapid mixing into the elastomer.

Generally from about 2 phr to about 40 phr of the thermotropic liquid crystalline polymer will be mixed into the elastomer. The rubber compositions of this invention will preferably contain from about 4 phr to about 30 phr of the thermotropic liquid crystalline polymer. It is typically more preferred for the rubber composition to contain from about 5 phr to about 15 phr of the liquid crystalline polymer.

The rubber compositions of this invention will frequently also contain a variety of additional compounding ingredients. For instance, it is necessary to include sulfur or sulfur containing compounds in the rubber composition for vulcanization to be possible. Thus, the rubber compositions of this invention can additionally include elemental sulfur and/or certain sulfur containing compounds. Such sulfur containing compounds are known to persons skilled in the art and donate sulfur during the vulcanization procedure to facilitate cure. Generally from about 0.2 to about 8 phr of sulfur or a sulfur containing compound will be present in productive rubber compositions of this invention. It is generally preferred for such productive rubber compositions to contain from about 0.5 to about 4 phr of sulfur with it being more preferred for such compositions to contain from about 1 to about 2.5 phr of sulfur. Such productive rubber compositions will also generally contain from about 0.1 phr to about 2.5 phr of at least one primary accelerator. It is generally preferred for 0.2 phr to 1.5 phr of the primary accelerator to be present in the productive rubber composition with it being more preferred for such compositions to contain from 0.3 phr to 1 phr of the primary accelerator. Virtually, any type of primary accelerator can be utilized in accordance with the process of this invention. Some representative examples of primary accelerators which can be utilized include thiazole accelerators, such as benzothiazyl disulfide and 2-mercaptobenzothiazole; sulfenamide accelerators, such as N-oxydiethylene benzothiazole-2-sulfenamide, N-t-butyl-2-benzothiazolesulfenamide, and N-cyclohexyl-2-benzothiazolesulfenamide; dithiocarbamate accelerators, such as bismuth dimethyldithiocarbamate, cadmium diethyldithiocarbamate, copper dimethyldithiocarbamate, lead dimethyldithiocarbamate, selenium diethyldithiocarbamate, tellurium diethyldithiocarbamate and zinc dimethyldithiocarbamate; thiuram accelerators, such as dipentamethylene thiuram hexasulfide, tetramethylthiuram monosulfide and tetraethylthiuram monosulfide; and thiourea accelerators, such as trimethyl thiourea and dimethylethyl thiourea.

The rubber composition can optionally contain one or more secondary accelerators. Such secondary accelerators are typically utilized at a concentration of from about 0.2 to about 0.8 phr. It is generally preferred for secondary accelerators to be utilized at a concentration which is within the range of about 0.05 phr to 0.5 phr with concentrations which are within the range of 0.1 phr to 0.3 phr being most preferred. Tetramethyl thiuram disulfide is a representative example of a secondary accelerator which can be used.

The rubber composition of this invention can also contain additional rubber chemicals, such as carbon black, antidegradants, oils, and waxes in conventional amounts. For instance, carbon black can be present in an amount ranging from about 1 phr to about 100 phr. However, it should be noted that the need for carbon black in the rubber composition of this invention is diminished due to the fact that the thermotropic liquid crystalline polymer increases the modulus of the rubber composition. It is believed that the thermotropic liquid crystalline polymer acts synergistically with carbon black to increase the modulus of the rubber composition. Accordingly, a high storage modulus can be attained utilizing much lesser amounts of carbon black than would be normally expected.

Virtually any type of thermotropic liquid crystalline polymer processing an aliphatic spacer which is substantially in the mesophase at a temperature which is within the range of about 40° C. to about 180° C. can be utilized in the rubber compositions of this invention. In other words, thermotropic liquid crystalline polymers which are substantially in the nematic phase or the smectic phase at a temperature which is within the range of about 40° C. to about 180° C. can be utilized in the rubber compositions of this invention. Such thermotropic liquid crystalline polymers are deemed to be substantially in the mesophase in situations where the polymer morphology is predominately amorphous even if minor amounts of crystallinity are present in the liquid crystalline polymer. Liquid crystalline polymers having the general structure formula $+A^1-R^1-A^2-R^2-R^3+_n$ wherein $A^1$ and $A^2$ can be the same or different and represent aromatic groups, wherein $R^1$ represents a bridging group, wherein $R^2$ represents a functional unit, and wherein $R^3$ represents a spacer, are highly suitable for use in the resin compositions of this invention. The aromatic groups ($A^1$ and $A^2$) in such a thermotropic liquid crystalline polymer can, for instance, be a benzene ring or a naphthalene group. Some representative examples of suitable aromatic groups include 1,3-benzenylene groups, 1,4-benzenylene groups, 1,4-naphthalenylene groups, 1,5-naphthalenylene groups, and 2,6-naphthalenylene groups. 1,4-benzenylene groups have the structural formula:

and 2,6-naphthalenylene groups have the structural formula:

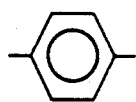

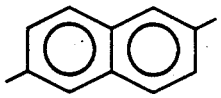

and both of these types of aromatic groups are highly preferred. Some representative examples of additional preferred aromatic groups include:

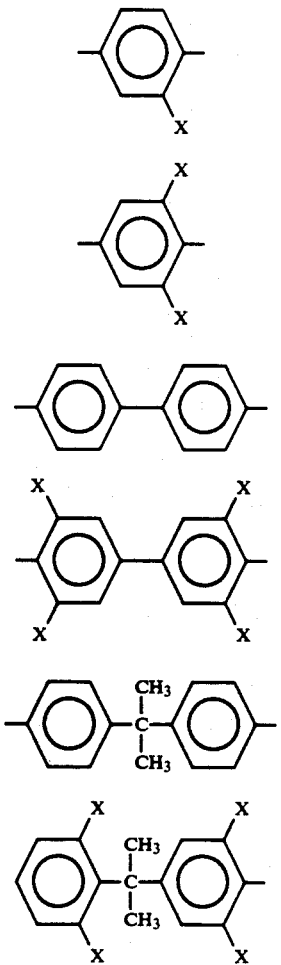

(I)

(II)

(III)

(IV)

(V)

(VI)

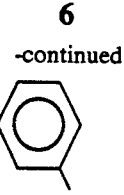

(VII)

It is not necessary for there to be a bridging group or a functional unit but there must be a spacer in such a liquid crystalline polymer. Such a liquid crystalline polymer can be represented by the simple structural formula $+A^1-A^2-R^3+$ wherein $A^1$ and $A^2$ represent aromatic groups which can be the same or different and wherein $R^3$ represents an aliphatic spacer. Such a liquid crystalline polymer which is derived from para-hydroxybenzoic acid, 6-hydroxy-2-napthoic acid and 1,6-hexane diol can be represented by the structural formula:

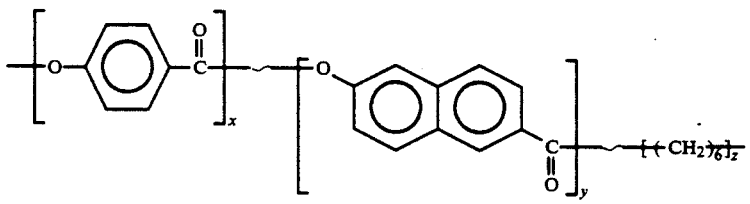

where x, y, and z are integers and wherein —∼— indicates that the distribution of repeat unit can be random. Some representative examples of bridging groups ($R^1$) that can be present in such liquid crystalline polymers include: —CO—O— groups, —CR=CR— groups, —CR=NO— groups, —CO=NH— groups, —NO=N— groups, —C≡C— groups, and —CR=N—N=CR— groups wherein R represents an alkyl group containing from 1 to 4 carbon atoms or a hydrogen atom. Some representative examples of functional units ($R^2$) that can be present in such liquid crystalline polymers include —O— groups, —CO—O— groups, and —O—CO—groups. Some representative examples of spacers ($R^3$) that can be present in such liquid crystalline polymers include $+CH_2+_n$ groups, —S—R—S— groups, —SiR$_2$—O— groups, and $+CH_2$-CHR$+_n$ groups, wherein R represents an alkyl group containing from 1 to 4 carbon atoms or a hydrogen atom. Spacer groups containing silicon, such as:

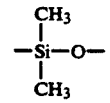

groups are believed to be particularly preferred spacers. Main-chain liquid crystalline polymers and side-chain liquid crystalline polymers which are suitable for use in the rubber compositions of this invention are described in greater detail by Chung, "The Recent Developments of Thermotropic Liquid Crystalline Polymers", Polymer Engineering and Science, Vol. 26, No. 13 (July, 1986) which is hereby incorporated herein by reference in its entirety.

Copolyesters which are made by polymerizing hydroquinone, p-hydroxylbenzoic acid, and a dicarboxylic acid having the structural formula HOOC $+CH_2+_n$ COOH are very high preferred for use as the thermotropic liquid crystalline polymer. The dicarboxylic acid utilized in preparing such thermotropic liquid crystalline polymers typically contain from about 6 to about 10 carbon atoms. Accordingly, n will normally represent an integer from about 4 to about 8. It is preferred for n to be an odd integer. This is because the crystalline to nematic transition occurs at 147° C. of if n is 7 (azelaic acid is utilized as the dicarboxylic acid), the crystalline to nematic transition occurs at a temperature of about 130° C. On the other hand, if n is 2, 6 or 8, the liquid crystalline polymer will have a crystalline to nematic transition at a temperature of 176° C., 218° C., or 188° C., respectively.

It is preferred for the thermotropic liquid crystalline polymer to be in the nematic phase at the temperature at which the rubber composition will be processed. During the nonproductive stage of compounding, temperatures which are within the range of about 140° C. to about 180° C. are typical. However, somewhat lower temperatures are generally utilized in carrying out the productive compounding. In fact, it is common for the productive compounding to be done at temperatures as low as about 100° C. It is accordingly preferred for the thermotropic liquid crystalline polymer to be in the nematic phase at temperatures which are within the range of about 110° C. to about 180° C. It is generally more preferred for the thermotropic liquid crystalline polymer to be in the nematic phase at a temperature which is within the range of about 110° C. to about 130° C. Such thermotropic liquid crystalline polymers will generally have a crystalline to nematic transition which is within that temperature range. However, amorphous liquid crystalline polymers which are in the nematic phase within the desired temperature range can also be utilized.

Productive compounds made utilizing the rubber compositions of this invention can be vulcanized utilizing standard vulcanization procedures. In most cases, the vulcanization procedure will be carried out at a temperature which is within the range of about 100° C. to about 300° C. In most cases, it will be desirable to utilize a vulcanization temperature which is within the range of about 135° C. to about 175° C.

The rubber compositions of this invention will find particular utility in applications where a high storage modulus is desired and where difficulties with processing are a particularly acute problem. Wire coat stock compounds and apex compounds utilized in building tires are examples of such applications wherein the rubber compositions of this invention find particular utility. The technique of this invention is of particular value in improving this processability and modulus of SBR. This is believed to be due do to improved compatibility between the rubber and the liquid crystalline polymer which is a result of the presence of phenyl groups which are present in the SBR.

This invention is illustrated by the following examples which are presented merely for the purpose of illustration and are not to be regarded as limiting the scope of the subject invention or the manner in which it can be practiced. Unless specifically indicated otherwise parts and percentages are given by weight.

EXAMPLE 1

A thermotropic liquid crystalline polymer which contained repeat units which were derived from hydroquinone, para-hydroxybenzoic acid, and azelaic acid was prepared in this experiment by melt condensation polymerization. In the procedure used equal molar amounts of para-hydroxybenzoic acid, hydroquinone and azelaic acid were charged into a 3 neck round bottom flask. Subsequently, 0.1 parts of sodium phosphate ($NA_3PO-4$ $12H_2O$) and 25 parts of acetic anhydride were charged into the round bottom flask. The round bottom flask was connected to a nitrogen inlet, a mechanical stirrer equipped with a glass rod and hastelloy blade, and finally a condenser. The temperature was raised to 130° C. with the contents of the flask being stirred. The reaction vessel was held at 130° C., under reflux, for about 1 hour to effect the acylation. A distillation head and column was then attached and the temperature was slowly raised to 250° C. with acetic acid and acetic anhydride being distilled out of the reaction vessel. Upon cessation of the distillation, the temperature of the reactor was raised to 290-300° C., after which time vacuum pull down was begun. An essentially complete vacuum of less than 0.5 mm of Hg was achieved in about 15 minutes. A liquid crystalline polymer having a crystalline to mesophase transition in the 130° C. to 150° C. range was produced. It was determined to have a random microstructure. This example shows that thermotropic liquid crystalline polymers based on hydroquinone, p-hydroxybenzoic acid and azelaic acid can be synthesized utilizing an in situ acylation technique.

EXAMPLES 2-7

In this series of experiments polymerizations were carried out using the performed diacetate of hydroquinone, p-acetoxy benzoic acid and azelaic acid. This method eliminated the high volume of distillants and also decreased the reaction time experienced in Example 1. The synthesis was essentially the same as that described in Example 1 except that sodium acetate was used as the catalyst and the one hour reflux at 130° C. was eliminated. Table I shows the intrinsic viscosity and the crystalline to nematic transition temperature of the copolyesters produced.

TABLE I

| Example | IV | Crystalline to Nematic Transition Temperature |
|---|---|---|
| 2 | 0.47 | 123° C. |
| 3 | 0.60 | 132° C. |
| 4 | 0.64 | 140° C. |
| 5 | 0.69 | 145° C. |
| 6 | 0.82 | 149° C. |
| 7 | 0.97 | 152° C. |

The diacetate of hydroquinone had a tendency to sublime into the distillation column. It was, therefore, necessary to charge the reactor in such a was so as to make up for this loss of the diacetate of hydroquinone. The highest intrinsic viscosity was obtained when a 1.6% molar excess of hydroquinone diacetate was employed. Air was used to cool the condenser, since water cooling caused more sublimate to form in the condensation column. Excess sublimate in the distillation path would eventually inhibit the formation of high vacuum in the latter stages of the polymerization reaction.

As can be determined by reviewing Table I, the crystalline to mesophase transition temperature was related to the molecular weight of the thermotropic liquid crystalline polymer. The intrinsic viscosity (IV) of such polymers increases with increasing molecular weight. Intrinsic viscosities were determined in a 60/40% phenol/tetrachlorethane mixed solvent system at 30° C. at a concentration of 0.4 g/dl.

It was determined by carbon 13 nuclear magnetic resonance spectrometry that the polymers produced had a random distribution of monomeric units. The polymers were also studied utilizing a Nikon polarizing microscope. When the liquid crystalline polymers were viewed on a heat stage, a threaded schlieren texture was observed.

EXAMPLES 8-11

In this series of experiments, liquid crystalline polymers were synthesized utilizing the procedure described in Examples 2-7 except that various other dicarboxylic acids were substituted for the azelaic acid utilized in Examples 2-7. Table II identifies the dicarboxylic acid which was utilized. Table II also shows the inherent viscosity and the crystalline to nematic transition temperature of the thermotropic liquid crystalline polymers which were prepared.

TABLE II

| Example | Dicarboxylic Acid | IV | Crystalline to Nematic Transition Temperature |
|---|---|---|---|
| 8 | adipic | 0.43 | 176° C. |
| 9 | pimelic | 0.40 | 147° C. |
| 10 | suberic | 0.42 | 218° C. |
| 11 | sebacic | 0.62 | 188° C. |

When working with the adipic acid (Example 8), it was necessary to maintain reaction temperatures at 250° C. because of the tendency toward degradation that the polymer showed at higher temperatures. Table II shows that liquid crystalline polymers having an even number of atoms in the aliphatic spacer have higher crystalline to nematic transition temperatures than do those in the same series with an odd number of carbon atoms in the aliphatic spacer. Accordingly, the utilization of azelaic acid or pimelic acid results in the liquid crystalline polymer having a lower crystalline to nematic phase transition temperature. This odd-even relationship is a function of n (wherein n is the number of methylene units in the aliphatic dicarboxylic acid). For example, in cases where adipic acid is utilized n is 4 or in cases where azelaic acid is utilized n is 7. This odd-even effect is believed to result from changes in the polarizability of the mesogens for both the normal and perpendicular components, according to the theory presented by Ober, Jin and Lenz, Advances in Polymer Science, Volume 59, page 124 (1984). The polarizability along the molecular axis is greater than that perpendicular to the axis for even chains, but is about equal for odd chains if an all trans confirmation is assumed. Stronger attraction exists between mesogens with even end groups.

EXAMPLES 12-15

In this series of experiments rubber compositions containing a thermotropic liquid crystalline polymer and SBR were prepared. The thermotropic liquid crystalline polymer utilized in this series of experiments was prepared utilizing the procedure described in Example 2. The liquid crystalline polymer was ground to a powder prior to being mixed with the SBR. The torque readings taken from the Haake mixer utilized after 5 minutes of mixing time are reported in Table III. Table III also reports the amount of liquid crystalline polymer incorporated into the rubber composition. The powder of liquid crystalline polymer was simply mixed with the SBR during the 5 minute mixing process. Example 12 was conducted as a control and did not include any of the liquid crystalline polymer.

TABLE III

| Example | phr of LCP | Torque |
|---|---|---|
| 12 | 0 | 2247 |
| 13 | 2 | 1969 |
| 14 | 12 | 1093 |
| 15 | 24 | 626 |

Mixing temperature utilized in this series of experiments was 150° C. As can be seen by reviewing Table III, significant decreases in processing viscosities were attained by incorporating the liquid crystalline polymer into the SBR. In fact, Example 15 shows that more than a three fold drop in processing viscosity can be realized by incorporating 24 phr of the thermotropic liquid crystalline polymer into the rubber. In fact, Example 13 shows that a very significant drop in torque could be realized by only incorporating 2 phr of the liquid crystalline polymer into the SBR.

EXAMPLES 16-18

This series of experiments was conducted utilizing the same general procedure described in Examples 12-15 except that natural rubber was substituted for the SBR. The results of this series of experiments is reported in Table IV.

TABLE IV

| Example | phr of LCP | Torque |
|---|---|---|
| 16 | 0 | 1760 |
| 17 | 12 | 1432 |
| 18 | 24 | 1183 |

The same viscosity trends which were observed in SBR were also seen in natural rubber although to a lesser extent. In any case, this series of experiments shows that the thermotropic liquid crystalline polymers could be utilized to reduce the torque in the Haake mixer.

EXAMPLES 19-22

In this series of experiments, various standard nonproductive recipes utilized in building tires were prepared. For instance, in Example 19 a standard nonproductive tire sidewall stock was prepared. In Examples 20, 21 and 22 standard nonproductive truck tread, passenger tread, and wire coat stocks were prepared. Table V reports the total work required in preparing these compounded stocks with and without utilizing the liquid crystalline polymers of this invention.

TABLE V

| Example | Stock | Total Work W/O LCP* | Total Work W/15 phr of LCP* |
|---|---|---|---|
| 19 | Sidewall | 515 | 455 |
| 20 | Truck Tread | 412 | 360 |
| 21 | Passenger Tread | 462 | 421 |
| 22 | Wirecoat | 556 | 500 |

*in MJ/m$^3$ (MegaJoules per cubic meter)

As can be seen by reviewing Table V, the amount of total work required in preparing standard tire stocks can be significantly reduced by incorporating 15 phr of the LCP in the blend. The LCP utilized in this series of experiments was prepared utilizing the procedure described in Example 2. In each case, less work was required to compound the stock containing the liquid crystalline polymer. On the average, about 10% less work was required when the liquid crystalline polymer was present.

EXAMPLES 23-26

In this series of experiments, productive tire stocks were prepared. Table VI shows the total amount of work required in preparing these tire stocks with and without the liquid crystalline polymer.

TABLE VI

| Example | Stock | Total Work W/O LCP* | Total Work W/15 phr of LCP* |
|---|---|---|---|
| 23 | Sidewall | 322 | 292 |
| 24 | Truck Tread | 381 | 343 |
| 25 | Passenger Tread | 414 | 366 |
| 26 | Wirecoat | 448 | 406 |

*in $MJ/m^3$

As can be determined by studying Table VI, the amount of work required in preparing these productive tire stocks was significantly reduced by including 15 phr of the LCP in the compound. The LCP utilized in this series of experiments was prepared utilizing the procedure specified in Example 2. Energy savings were realized in compounding the productive stocks in this series of experiments even though the mixing was done at a temperature of only about 100° C. This series of experiments shows that improved processability is realized even below the temperature of the crystalline to nematic transition of the liquid crystalline polymer. Accordingly, the liquid crystalline polymers of this invention can be utilized to improve the processability of rubbers in preparing both nonproductive compounds and productive compounds.

EXAMPLES 27-30

In this series of experiments, styrene-butadiene rubber (SBR) was blended with a thermotropic liquid crystalline polymer and/or carbon black. The liquid crystalline polymer utilized contained equal molar amounts of p-hydroxybenzoic acid, hydroquinone, and azelaic acid. Productive compounds were made by utilizing a standard cure recipe. After mixing, the SBR samples were cured between two parallel plates. These plates were designed to be clamped into holding fixtures which can be mounted on a Rheometrics System 7700. The Rheometrics standard transducer was calibrated using procedures for both force and phase angle. Storage modulus was then measured at a variety of temperatures. The storage modulus of the samples is reported in Table VII.

TABLE VII

| Example | Sample | G' at 1° C. | G' at 52° C. |
|---|---|---|---|
| 27 | Control | $9.14 \times 10^6$ | $7.91 \times 10^6$ |
| 28 | 15 phr LCP | $1.67 \times 10^7$ | $1.14 \times 10^7$ |
| 29 | 40 phr CB | $4.14 \times 10^7$ | $2.53 \times 10^7$ |
| 30 | 15 phr LCP/ 40 phr CB | $1.32 \times 10^8$ | $5.63 \times 10^7$ |

LCP = liquid crystalline polymer
CB = carbon black
G' = storage modulus (dyne/sq. cm.)

LCP=liquid crystalline polymer
CB=carbon black
G'=storage modulus (dyne/sq. cm.)

The control (Example 27) consisted of only the SBR and the cure package. It is apparent that the reinforcing effect of the LCP by itself is quite small (Example 28) in comparison to the elastomer with 40 phr of carbon black added (Example 29). The greatest reinforcing effect was observed in Example 30 where the carbon black and LCP are present together. It appears that the LCP and carbon black are acting synergistically to increase storage modulus.

EXAMPLES 31-34

In this series of experiments, a blend containing 75% emulsion SBR and 25% synthetic polyisoprene was compounded with 7 phr of an LCP and standard agents utilized in making productive compounds. The rubber samples made were cured and tested using the procedure specified in Examples 27-30. Example 31 was done as a control and did not include an LCP.

TABLE VIII

| Example | Sample | G' at 1° C. | G' at 52° C. |
|---|---|---|---|
| 31 | Control | $5.12 \times 10^7$ | $2.80 \times 10^7$ |
| 32 | BHAD | $9.54 \times 10^7$ | $4.66 \times 10^7$ |
| 33 | BHAS | $8.77 \times 10^7$ | $4.09 \times 10^7$ |
| 34 | BHA | $1.08 \times 10^8$ | $4.39 \times 10^7$ |

BHAD = LCP containing equal molar amounts of p-hydroxybenzoic acid, hydroquinone, and adipic acid
BHAS = LCP containing equal molar amounts of p-hydroxybenzoic acid, hydroquinone and sebacic acid
BHA = LCP containing equal molar amounts of p-hydroxybenzoic acid, hydroquinone, and azelaic acid
G' = storage modulus (dyne/sq. cm.)

BHAD=LCP containing equal molar amounts of p-hydroxybenzoic acid, hydroquinone, and adipic acid BHAS=LCP containing equal molar amounts of p-hydroxybenzoic acid, hydroquinone and sebacic acid BHA=LCP containing equal molar amounts of p-hydroxybenzoic acid, hydroquinone, and azelaic acid G'=storage modulus (dyne/sq. cm.)

This series of experiments shows the same general trend as was observed in Examples 27-30. At low temperatures, there was a substantial increase in storage modulus and as the temperature was increased, there was a decrease in modulus, approaching that of the control. Very little difference was observed between the reinforcement characteristics of the three different liquid crystalline polymers.

EXAMPLES 35-36

These experiments were conducted utilizing the procedure described in Examples 32 and 33 except that the amount of LCP utilized in the rubber composition was increased to 14 phr. In Examples 35 BHAD was used as the LCP. The storage modulus of the rubber compositions made is reported in Table IX.

TABLE IX

| Example | Sample | G' at 1° C. | G' at 52° C. |
|---|---|---|---|
| 35 | BHAD | $1.06 \times 10^8$ | $4.91 \times 10^7$ |
| 36 | BHAS | $1.09 \times 10^8$ | $4.60 \times 10^7$ |

G' = storage modulus (dyne/sq. cm.)

G'=storage modulus (dyne/sq. cm.)

Increasing the amount of LCP utilized from 7 phr to 14 phr further increased the storage modulus of the rubber compositions. AS a general rule, when a composition is added to rubber for the purpose of reinforcement, the rubber processes with greater difficulty. However, substantial gains in reinforcement without sacrificing processability can be realized by utilizing the blend of this invention. Improved die swell characteristics may also be attained by including the thermotropic liquid crystalline polymers of this invention in rubbers.

COMPARATIVE EXAMPLES 37–39

This series of experiments was conducted using the same general procedure described in Examples 12-15 except that a wholly aromatic liquid crystalline polymer (Vectra A900) was substituted for the LCP utilized in Examples 13-15. The results of this series of experiments is reported in Table X.

TABLE X

| Example | phr of Fully Aromatic LCP | Torque |
|---------|---------------------------|--------|
| 37 | 0 | 2583 |
| 38 | 12 | 2763 |
| 39 | 24 | 2936 |

As can be seen by reviewing Table X, the utilization of the fully aromatic LCP did not decrease processing viscosities. In fact, Examples 38 and 39 show that the incorporation of the wholly aromatic LCP into the rubber increased torque. This series of examples shows that fully aromatic liquid crystalline polymers are not useful in practicing this invention.

COMPARATIVE EXAMPLES 40–42

This series of experiments was also conducted utilizing the same general procedure as is described in Examples 12-15 except that poly(p-hydroxybenzoate), which is another fully aromatic LCP, was substituted for the LCP utilized in Examples 13-15. The results of this series of experiments is reported in Table XI.

TABLE XI

| Example | phr of poly(p-hydroxybenzoate) | Torque |
|---------|-------------------------------|--------|
| 40 | 0 | 2583 |
| 41 | 12 | 2885 |
| 42 | 24 | 2614 |

This series of experiments shows that the incorporation of poly(p-hydroxybenzoate) into the SBR did not reduce torque values.

While certain representative embodiments and details have been shown for the purpose of illustrating the subject invention, it will be apparent to those skilled in this art that various changes and modifications can be made therein without departing from the scope of the invention.

What is claimed is:

1. A rubber composition having a high modulus and excellent processability which is comprised of a blend of (1) at least one elastomer selected from the group consisting of polybutadiene rubber, styrene-butadiene rubber, synthetic polyisoprene rubber, natural rubber, isoprene-butadiene rubber, isoprene-butadiene-styrene rubber, nitrile rubber, carboxylated nitrile rubber, and EPDM rubber, (2) at least one thermotropic liquid crystalline polymer containing an aliphatic spacer which has a crystalline to nematic transition at a temperature which is within the range of about 110° C. to about 220° C., wherein the thermotropic liquid crystalline polymer is comprised of repeat units which are derived from hydroquinone, p-hydroxylbenzoic acid, and an aliphatic dicarboxylic acid having the structural formula HOOC $-(CH_2)_n-$ COOH wherein n represents an integer from about 4 to about 8, and (3) carbon black.

2. A rubber composition as specified in claim 1 wherein the elastomer is styrene-butadiene rubber.

3. A rubber composition as specified in claim 1 wherein from about 4 to about 30 phr of at least one thermotropic liquid crystalline polymer is present.

4. A rubber composition as specified in claim 1 wherein from about 5 phr to about 15 phr of at least one thermotropic liquid crystalline polymer is present.

5. A rubber composition as specified in claim 1 wherein the thermotropic liquid crystalline polymer has a crystalline to nematic transition at a temperature which is within the range of about 110° C. to about 180° C.

6. A rubber composition as specified in claim 1 wherein the aliphatic dicarboxylic acid is azelaic acid.

7. A rubber composition as specified in claim 1 wherein the aliphatic dicarboxylic acid is pimelic acid.

8. A rubber composition as specified in claim 1 wherein the elastomer is natural rubber.

9. A rubber composition as specified in claim 1 wherein the rubber composition was prepared by mixing the thermotropic liquid crystalline polymer with the elastomer in the absence of a curative.

10. A rubber composition as specified in claim 1 wherein said rubber composition was prepared by mixing a powder of the thermotropic liquid crystalline polymer throughout the elastomer.

11. A rubber composition as specified in claim 9 wherein the liquid crystalline polymer was in the form of a powder during the mixing procedure.

12. A rubber composition as specified in claim 1 which further comprises carbon black.

13. A rubber composition as specified in claim 1 wherein said rubber composition is vulcanized.

14. A rubber composition specified in claim 1 which further comprises sulfur or a sulfur containing compound.

15. A rubber composition as specified in claim 14 which further comprises at least one accelerator.

16. A rubber composition as specified in claim 1 wherein said elastomer is polybutadiene.

17. A rubber composition as specified in claim 1 wherein the aliphatic dicarboxylic acid is suberic acid.

18. A rubber composition as specified in claim 1 wherein the aliphatic dicarboxylic acid is sebacic acid.

* * * * *